Oct. 23, 1956    K. RABE ET AL    2,768,002
INDEPENDENT WHEEL SUSPENSION FOR THE STEERABLE
WHEELS OF AUTOMOTIVE VEHICLES
Filed March 31, 1953    2 Sheets-Sheet 1

INVENTORS
Karl Rabe and
Leopold Schmid
By—Pennie, Edmonds, Morton, Barrows & Taylor
Attorneys.

Oct. 23, 1956  K. RABE ET AL  2,768,002
INDEPENDENT WHEEL SUSPENSION FOR THE STEERABLE
WHEELS OF AUTOMOTIVE VEHICLES
Filed March 31, 1953  2 Sheets-Sheet 2

INVENTORS
Karl Rabe and
Leopold Schmid
By Pennie, Edmonds, Morton, Burrows & Taylor
Attorneys.

United States Patent Office 2,768,002
Patented Oct. 23, 1956

2,768,002

INDEPENDENT WHEEL SUSPENSION FOR THE STEERABLE WHEELS OF AUTOMOTIVE VEHICLES

Karl Rabe, Korntal, and Leopold Schmid, Stuttgart-Sillenburg, Germany, assignors to Dr. Ing. h. c. F. Porsche K.-G., Stuttgart-Zuffenhausen, Germany Application March 31, 1953, Serial No. 345,912

Claims priority, application Germany April 4, 1952

9 Claims. (Cl. 280—124)

This invention relates to improvements in independent wheel suspensions for the steerable wheels of automotive vehicles and more particularly to such a suspension including longitudinal guiding or suspension arm members operable under the influence of springs and guided in their up and down movement by shock absorbers.

The primary object of the invention is to provide a relatively light weight construction for the suspension of the steerable wheels of automotive vehicles, in which the torque or guiding arm members are pivoted directly on the frame of the vehicle.

In known types of constructions, it is recognized that in order to insure a sufficient lateral stability for the guiding arm members of the steerable wheels of automotive vehicles, such members must be designed with long supporting sleeves. Furthermore, particular care must be taken that such members are made as short as reasonably possible, since the longer such members are, the greater the lateral instability and the heavier the members must be made.

In accordance with an important feature of the present invention, the foregoing difficulties have been overcome by providing cross-stays from the vehicle frame to each of the longitudinal guiding members, thereby stiffening such members and making it possible to have them longer without in any way reducing their lateral stability.

In accordance with an advantageous construction, the guiding members or the supporting arm levers which extend longitudinally of the vehicle are pivoted at one end in rubber bearings mounted on the frame of the vehicle. When such members are braced laterally with the stays, it is possible to do away entirely with the long supporting sleeves used and expensive linkages used in known types of construction. Furthermore, such members can be made of pressed sheet metal and in the end achieve a wheel suspension, which is light in weight and inexpensive.

In the preferred construction, the cross-stays preferably comprise torsion bar springs, which are suspended joint like in the middle of the frame. With such a construction it is possible to provide a stabilizer which connects the relatively short supporting sleeves of the guiding members in the rubber bearings. This stabilizer advantageously is in the form of a torsion bar, the ends of which are respectively fixed to the sleeves.

In an alternative construction, a pair of parallel torsion bars are used to connect into the respective sleeves while a stabilizer is used to effect the bracing of the members against lateral displacement, such stabilizer being pivotally mounted in the middle of the frame and preferably including a thickened portion at its mid-point which is embedded in the rubber bearing arranged to absorb any forces laterally applied against the arm members. A rubber bearing of this type is inexpensive, has a low weight and serves in place of any linkage whatever.

Where a stabilizer is provided, journalled in a rubber bearing in the middle of the vehicle frame and bracing the longitudinal steering members, the spring action for the free ends of the guiding members may be provided by means of coil springs surrounding the shock absorbers connected to the free ends of the guiding members. The improved wheel suspension of the present invention constitutes a simple and cheap construction which provides good lateral stability.

The improved wheel suspension of the invention is described in detail hereinafter in connection with the accompanying drawings, in which.

Figure 1:
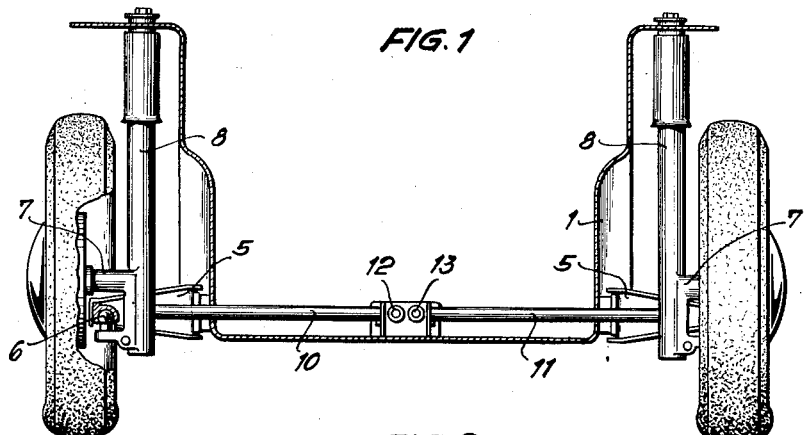
Fig. 1 is a front view, partly in section, of a vehicle wheel suspension with longitudinal supporting and guiding members, in accordance with the invention, with parts broken away and other parts removed to clarify the showing.
Figure 2:
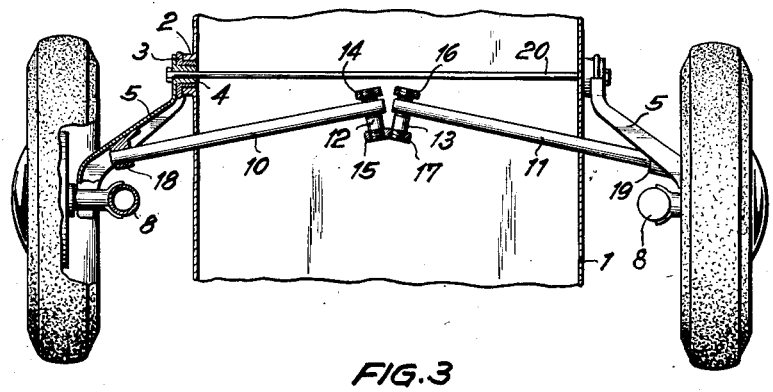
Fig. 2 is a top plan view, partly in section, of the wheel suspension of Fig. 1.

In the front wheel suspension shown in Figs. 1 and 2, there are mounted on the frame 1 bearings 2 which respectively carry the supporting sleeves 4 of the longitudinal torque arms or guiding members 5, with interposed rubber bushings 3. The free ends of the longitudinal supporting arm members 5 are each connected through a ball bearing 6 with a yoke 7, to which the front wheel is attached by means not shown, the yoke being fastened to a shock absorber 8 vertically suspended from the frame 1. Furthermore, pivotally mounted on the frame 1 are torsion bar springs 10, 11 which may be made of several lamellae. The pivoting is effected by means of the bolts 12 and 13, respectively, which are rotatably fastened in the bearings 14 and 15, and 16 and 17, respectively, the inner ends of the springs 10 and 11 being clamped or otherwise fixed to the bolts 12 and 13 respectively. The other ends of the torsion bar springs are clamped or fixed in brackets 18 and 19, respectively, on the longitudinal members 5. The two torsion bar springs 10 and 11 are arranged so that each is inclined relatively to the other and in the manner shown in Fig. 2.

Because of the torsion bar springs and the position of the brackets 18, 19 the longitudinal guiding arms 5 are braced against lateral forces. Thus it becomes possible to make the supporting sleeves 4 short, and furthermore to journal them yieldably by means of a rubber bushing. Another advantage resides in that the longitudinal guiding members can be made not only lighter but can also be given a greater length than in the conventional designs, in which the lateral forces must be counteracted solely by the guiding members. If the longitudinal guiding members are made longer than was possible with the earlier designs then the torsion bar springs can be made shorter. Also thereby the chord height of the arc traversed by the longitudinal guiding member becomes smaller.

In the construction shown in Figs. 1 and 2 a torsion bar spring 20 extends through the two bearings 2 for the supporting sleeves 4 and is coupled with the latter for rotation therewith. Therefore, this torsion rod spring acts as a stabilizer for the torque or supporting arms or levers 5. The straight-line guidance of the shock absorbers 8 in combination with longitudinal arm members 5, swinging in the longitudinal direction avoids distortions due to spreading. The stabilizer by which the longitudinal arm members 5 are connected, then firmly holds the sleeves in place in the bearings. Thus, a low-weight construction of vehicle suspension is provided, which is particularly suitable for the smaller types of automotive vehicles.

Other arrangements based on the principles involved in the construction of Figs. 1 and 2, and which embody the same advantages, are shown in the subsequent figures of the drawings.

Figure 3:
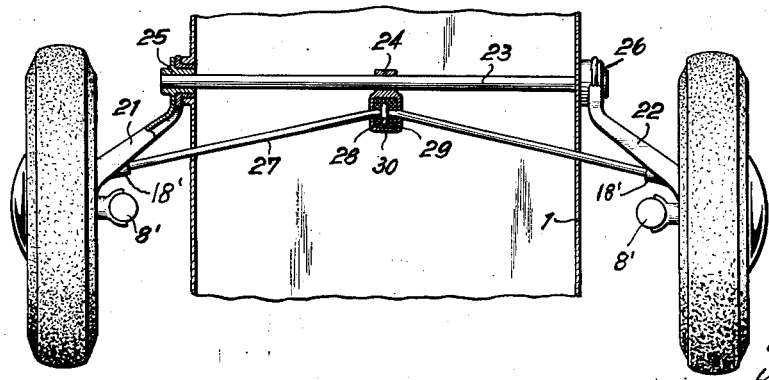
Fig. 3 is a top plan view, partly in section, of a modified form of construction.

Fig. 3 shows an arrangement with straight-line guidance by shock absorbers 8' in which the two longitudinal arm members 21 and 22, having the same structure as the members 5, are likewise connected by a torsion bar spring 23, which in this case however, serves for providing a spring action. The torsion bar spring 23 is clamped in the known manner by a clamping member 24 at the middle of the vehicle frame 1, and its free ends are rigidly connected with the supporting sleeves 25 and 26, respectively, the bearings 2 being the same as in Fig. 2. The longitudinal arm members 21 and 22 in Fig. 3 are braced by a stabilizer rod 27 which is bent in the middle between its ends to form a wide V having two legs arranged at an obtuse angle, relative to each other. At its middle part, stabilizer rod 27 has an enlarged portion 28 in the form of a ring. A bearing casing 29 for the stabilizer 27 is provided on the vehicle frame, preferably built together with the clamping member 24 for the torsion bar spring 23. The space between the bearing casing 29 and the thickened part 28 of the stabilizer is filled with an elastic material, preferably rubber 30, whereby the stabilizer 27 is pivotally journaled. The ends of the stabilizer are clamped against rotation in the bearings 18'. In this form of construction, as in that of Figs. 1 and 2, the longitudinal arm members 21, 22 can be made long and, in spite thereof, the supporting sleeves 25, 26 can be short. The side stability is high due to the bracing of the longitudinal arm members by the stabilizer rod 27.

Figure 4:
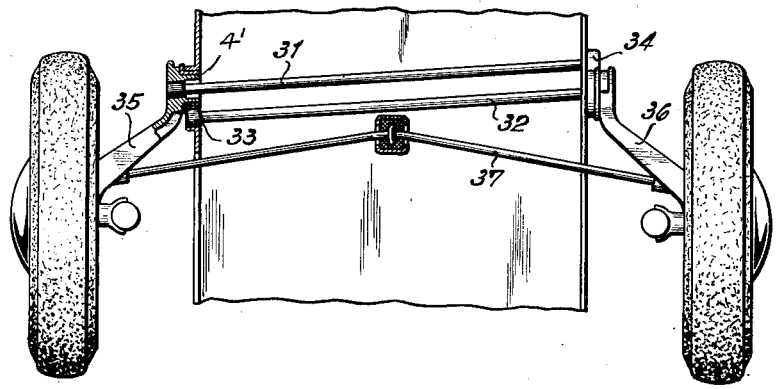
Fig. 4 is a top plan view similar to that of Fig. 3, showing another modification.

Instead of a single torsion bar spring 23 for the spring action of the suspension one can also use two bars arranged either in juxtaposition or in superposition. An arrangement in which two torsion bar springs are arranged horizontally in juxtaposition is shown in Fig. 4, in which the torsion bar springs 31 and 32 has ends respectively clamped in the vehicle frame on one side at 33 and 34. These bar springs extend throughout the entire width of the vehicle and at their other ends extend respectively through the short sleeves 4' and are coupled against rotation with the corresponding longitudinal arm members 35 and 36, respectively, as by a splined connection as shown. The torsion bar springs 31 and 32 are parallel but arranged at a slight angle to the axis of the vehicle so that the sleeve bearings are on a line at right angles to the axis of the vehicle. The stabilizer 37 is designed and journaled in the same manner as in Fig. 3.

Figure 5:
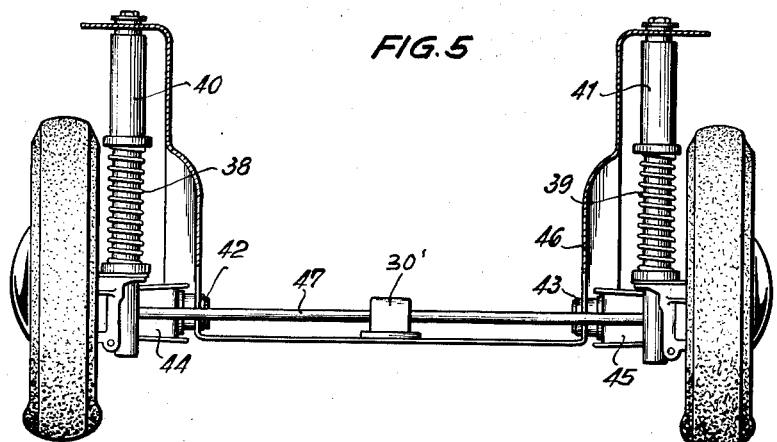
Fig. 5 is a front view, partly in section, of a construction with coil springs.
Figure 6:
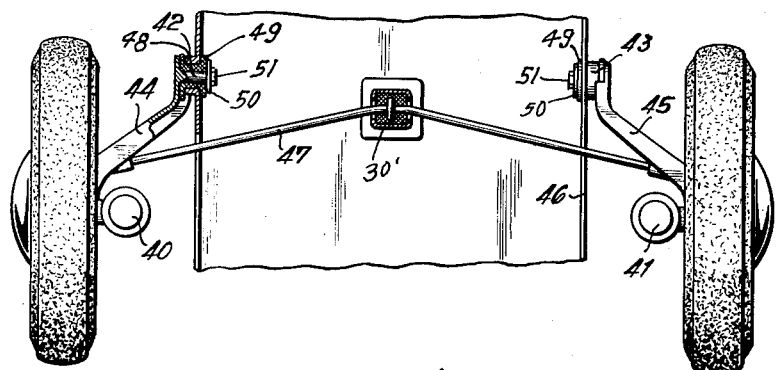
Fig. 6 is a top plan view, partly in section, of the construction shown in Fig. 5.

Figs. 5 and 6 show a form of construction which differs from those described above essentially in that the means for providing the spring action instead of the torsion bar springs, is coil springs 38 and 39, respectively which surround the shock absorbers 40 and 41, respectively. In this form of construction the supporting pivot bolts 42, 43 of the longitudinal supporting arm members 44 and 45, used in place of sleeves, are respectively journaled in bearings 48 in frame 46. The bearings 48 each includes a rubber bushing 49 and the bolts or pivot pins 42, 43 are held in place by a nut 50 and washer 51. The arrangement of the stabilizer 47 is the same as those for the stabilizers 27 and 37 shown in Figs. 3 and 4.

The longitudinal arm members are preferably made of pressed sheet metal in the channel-shaped form shown in the drawings.

We claim:
1. In an independent wheel suspension for the wheels of an automotive vehicle including a vehicle frame and a pair of wheels directly opposite each other on opposite sides of the frame, means for independently suspending each of said pair of wheels including an arm member extending longitudinally of the vehicle, bearing means for pivotally mounting one end of said arm member on the vehicle frame on a horizontal pivot axis, means for attaching the other end of said arm member to said wheel, an upright shock absorbing means mounted between said attaching means and the frame, a cross-stay extending generally transversely of the vehicle having one end fixed to said arm member intermediate the ends of the arm member, and means for attaching said cross-stay to the vehicle frame in a manner to prevent lengthwise movement of the cross-stay relative to the frame of the vehicle, whereby the end of the arm member to which the wheel is attached and the wheel are braced against lateral displacement due to forces applied laterally to said wheel.

2. An independent wheel suspension as claimed in claim 1, in which said cross-stay comprises a torsion bar spring said one end of which is fixed against rotation with respect to said arm member, the other end of said torsion bar spring being attached to the transverse mid-portion of the vehicle frame and held against rotation.

3. An independent wheel suspension as claimed in claim 1, in which said bearing means for pivotally mounting one end of the arm member on the vehicle frame includes a relatively short sleeve fixed to said end of the arm member and journaled in a portion of the bearing on the vehicle frame, and a torsion bar extending transversely across the frame having its ends respectively extending into and fixed against relative rotation with respect to the short sleeves carried by said arm members.

4. An independent wheel suspension as claimed in claim 1 in which said cross-stay extends transversely of the vehicle frame with its ends respectively attached to said arm members intermediate the ends of the arm members, and in which the means for attaching the cross-stay to the vehicle frame includes means for attaching the cross-stay at substantially its mid-point to the middle of the vehicle frame.

5. An independent wheel suspension as claimed in claim 1, in which the bearing means for pivotally mounting one end of each arm member includes a short laterally-extending sleeve fixed to the arm member and journaled in a portion of the bearing carried by the vehicle frame, and a pair of torsion bars extending laterally across the vehicle frame, the respective torsion bars having ends respectively fixed in the short sleeves and the other ends respectively fixed against rotation with respect to the vehicle frame, said torsion bars being inclined slightly with respect to the longitudinal axis of the vehicle so that the short sleeves are arranged opposite each other on a straight line at right angles to the longitudinal axis of the vehicle.

6. In an independent wheel suspension for the wheels of an automotive vehicle including a vehicle frame and a pair of wheels directly opposite each other on opposite sides of the frame, means for independently suspending each of said pair of steerable wheels including an arm member extending longitudinally of the vehicle, bearing means for pivotally mounting one end of said arm member on the vehicle frame on a horizontal pivot axis, means for attaching the other end of said arm member to said wheel, an upright shock absorbing means mounted between said attaching means and the frame, means for bracing said arm members against lateral displacement including a cross-stay extending generally transversely of the vehicle and having its respective ends fixed to the longitudinally extending arm members intermediate the ends of the arm members, said cross-stay having a thickened portion at its middle, and a bearing means attached to the vehicle frame and engaging and retaining said thickened portion of the cross-stay against appreciable transverse movement relative to the vehicle frame, whereby the respective ends of the longitudinally extending arm members to which the wheels are respectively attached and the wheels are braced against lateral displacement due to forces applied laterally to either of said wheels.

7. An independent wheel suspension as claimed in claim 6, in which said cross-stay comprises a torsion bar the ends of which are fixed against rotation with respect to the longitudinally extending arm members, whereby said cross-stay aids in stabilizing the up and down movement of the ends of the arm members to which the pair of wheels are respectively attached.

8. An independent wheel suspension as claimed in claim 7, in which the torsion bar cross-stay is in the form of a wide V arranged in a substantially horizontal plane with the apex of the torsion bar cross-stay pointing in the same general direction as the arm members extending from the wheels.

9. An independent wheel suspension as claimed in claim 1, in which the cross-stay is mounted in a substantially horizontal plane and extends at an angle to the axis of the pair of wheels in the same general direction as the arm member extending from the wheel to which the arm member is attached.

References Cited in the file of this patent

UNITED STATES PATENTS

| | | |
|---|---|---|
| 1,864,247 | Hoffman | June 21, 1932 |
| 2,254,261 | Best | Sept. 2, 1941 |
| 2,582,775 | Giacosa | Jan. 15, 1952 |
| 2,624,592 | MacPherson | Jan. 6, 1953 |
| 2,695,791 | Heftler | Nov. 30, 1954 |

FOREIGN PATENTS

| | | |
|---|---|---|
| 879,169 | France | Feb. 16, 1943 |